(12) United States Patent
Barnabo et al.

(10) Patent No.: US 6,907,795 B2
(45) Date of Patent: Jun. 21, 2005

(54) SEAT POSITION SENSOR

(75) Inventors: Susan Barnabo, Walpole, MA (US); Colin White, Warren, RI (US); Robert Southworth, Mansfield, MA (US); Genn Baskin, Sharon, MA (US); Jerry Powers, Dedham, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/292,395

(22) Filed: Nov. 12, 2002

(65) Prior Publication Data

US 2003/0117000 A1 Jun. 26, 2003

Related U.S. Application Data

(60) Provisional application No. 60/347,840, filed on Nov. 9, 2001.

(51) Int. Cl.[7] ................................................ G01L 1/25
(52) U.S. Cl. .................................................... 73/862.69
(58) Field of Search ...................... 73/862.39; 280/735; 180/272; 324/207.3

(56) References Cited

U.S. PATENT DOCUMENTS

| 4,471,304 | A |   | 9/1984  | Wolf ............................ 324/208 |
|-----------|---|---|---------|------------------------------------------|
| 4,592,249 | A |   | 6/1986  | Lehmann et al. .............. 74/473      |
| 4,667,514 | A | * | 5/1987  | Baer ............................ 73/386   |
| 4,909,560 | A | * | 3/1990  | Ginn ........................ 296/65.15    |
| 5,003,363 | A |   | 3/1991  | Lachmann .................... 357/27       |
| 5,074,583 | A |   | 12/1991 | Fujita et al. ................. 280/735   |
| 5,231,352 | A |   | 7/1993  | Huber ........................ 324/207     |
| 5,359,288 | A |   | 10/1994 | Riggs et al. ................. 324/207    |
| 5,398,185 | A |   | 3/1995  | Omura ........................ 364/424     |
| 5,413,378 | A |   | 5/1995  | Steffens, Jr. et al. ......... 280/735    |
| 5,460,405 | A |   | 10/1995 | Faigle et al. ................. 280/735   |
| 5,493,216 | A |   | 2/1996  | Asa ............................. 324/207  |
| 5,531,472 | A |   | 7/1996  | Semchena et al. .......... 280/735        |
| 5,542,493 | A | * | 8/1996  | Jacobson et al. ........... 180/272       |
| 5,608,317 | A |   | 3/1997  | Hollmann .................... 324/207      |
| 5,653,462 | A |   | 8/1997  | Breed et al. ................. 280/735    |
| 5,893,582 | A | * | 4/1999  | Allen et al. .................. 280/735   |
| 5,967,549 | A |   | 10/1999 | Allen et al. .................. 280/735   |
| 6,053,529 | A | * | 4/2000  | Frusti et al. ................. 280/735   |
| 6,095,555 | A | * | 8/2000  | Becker et al. ............... 280/735     |
| RE37,466  | E |   | 12/2001 | Allen et al. .................. 280/735   |
| 6,351,994 | B1 | * | 3/2002  | Pinkos et al. .............. 73/432.1     |
| 6,561,544 | B1 |   | 5/2003  | Clancy, III et al. ......... 280/735      |
| 6,573,623 | B2 | * | 6/2003  | Tsuboi et al. ................. 310/12    |
| 6,593,735 | B2 | * | 7/2003  | Becker .................. 324/207.26       |
| 2003/0060997 | A1 | * | 3/2003 | Iiyes .......................... 702/127   |

FOREIGN PATENT DOCUMENTS

JP          5-213142        8/1993

* cited by examiner

Primary Examiner—Edward Lefkowitz
Assistant Examiner—Takisha Miller
(74) Attorney, Agent, or Firm—Grossman, Tucker, Perreault & Pfleger, PLLC (57) ABSTRACT

A seat position sensor including a generally u-shaped housing and a cover disposed on the housing for blocking entry contaminants into a shunt opening of the housing. A sensor including mounting wings that flex upon mounting is also provided, as is a sensor including an integral connector, and a two-piece sensor configuration. A PCB including a heat throttle trace and a heat sink region, and a supply voltage circuit for a Hall Effect sensor including a parallel connected varistor are also provided.

6 Claims, 9 Drawing Sheets

SEAT POSITION SENSOR

CROSS REFERENCE TO RELATED APPLICATIONS

The present application claims the benefit of the filing date of U.S. Provisional Application No. 60/347,840, filed Nov. 9, 2001, the teachings of which are incorporated herein by reference.

FIELD OF THE INVENTION

The present invention relates generally to position sensing, and, in one embodiment, relates to a Hall Effect position sensor for sensing seat position in an automobile.

BACKGROUND OF THE INVENTION

In a wide variety of applications it is advantageous or necessary to sense the position of a linearly movable element. For example, in automobile seat applications the seat may be linearly movable, either manually or automatically via electromechanical means, on an associated track assembly. A sensor may provide a signal representative of the linear position of the seat on the track for a variety of purposes, e.g. to control deployment of an air bag, to control the electromechanical actuator that causes translation of the seat in connection with a seat position memory feature, etc.

For a seat position application, it is increasingly desirable for a sensor to provide multiple position outputs for purposes of ascertaining occupant position. For example, in applications where seat position is used to control air bag deployment early configurations involved only single stage air bag systems. A single stage air bag deploys with a known deployment force that may not be varied. In this application, seat position information was used only to determine when the airbag should be deployed. However, the advent of dual stage air bags, i.e. air bags that may be deployed with two distinct deployment forces, required increased resolution in position sensing. Also, the industry is now moving to variable stage airbags where the deployment force may be varied depending upon occupant position and classification. Variable stage airbag configurations will require a sensor that can detect multiple seat positions for use in determining the appropriate deployment force.

Another desirable feature of a position sensor, especially in the context of an automobile seat application, is that it be non-contact. A non-contact sensor has a sensing element that does not physically contact the sensed object. It is also advantageous that the sensor be mechanically decoupled from the seat track in an automobile seat application. These features allow quiet operation of the sensor and minimize wear, which could cause deterioration of performance.

Another difficulty associated with seat position sensors is that the seat track environment is very crowed. Also the space available for the sensor may vary from among vehicle types. The size and packaging of the sensor should, therefore, be flexible to allow use in a variety of vehicle types. In addition, it would be advantageous to have a menu of sensor configurations to allow selective use of an appropriate configuration depending on the track environment.

Accordingly, there is a need for a non-contact position sensor that provides accurate and reliable position sensing that may be cost-effectively produced and installed.

SUMMARY OF THE INVENTION

According to one aspect of the invention there is provided a seat position sensor including: a generally u-shaped housing including first and second arms separated by a shunt opening; a magnet disposed in the first arm; a Hall Effect sensor disposed in the second arm and in a magnetic field generated by the magnet; and a cover disposed on the housing. The cover is spring biased in a first position wherein a portion of the cover obstructs the shunt opening and is movable against the spring bias to a second position for allowing entry of a shunt into the shunt opening. The magnet may include neodymium, and the Hall Effect sensor may be a programmable Hall Effect sensor.

According to another aspect of the invention, there is provided a seat position sensor including a generally u-shaped housing including first and second arms separated by a shunt opening; a magnet disposed in the first arm; a Hall Effect sensor disposed in the second arm and in a magnetic field generated by the magnet; and first and second mounting wings extending from opposite sides of the housing. Each of the mounting wings includes a mounting opening for receiving a fastener for fixing the housing to a mounting position. The mounting wings are configured to flex inward against the mounting position upon fastening the housing to the mounting position.

According to yet another aspect of the invention, there is provided a position sensor including: a generally u-shaped housing including first and second arms separated by a shunt opening; a magnet disposed in the first arm; a Hall Effect sensor disposed in the second arm and in a magnetic field generated by the magnet; and a connector affixed to the housing and including at least one terminal electrically connected to the Hall Effect sensor. The connector may be a right angle connector.

According to a further aspect of the invention there is provided a printed circuit board including a first conductive trace electrically to a second conductive trace through a heat throttle trace and a heat sink region. According to another aspect of the invention, there is provided a supply voltage circuit for a Hall Effect sensor including at least one varistor connected in parallel with at least one capacitor and first and second input terminals of the Hall Effect sensor; and supply voltage input terminals for providing a supply voltage across the varistor.

According to another aspect of the invention, there is provided a seat position sensor system including: a magnet coupled to a first seat rail; a sensor housing coupled to a second seat rail adjacent the magnet in at least one position of the seat; and a Hall Effect sensor disposed in the housing and in a magnetic field of the magnet in the at least one position.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Sensors consistent with the present invention will now be described in connection with exemplary embodiments thereof. Although the description includes use of sensors consistent with the invention in a vehicle seat position sensing application, a sensor consistent with the invention has utility in any application where linear position sensing is desired. It is to be understood, therefore, that the illustrated embodiments are provided by way of explanation, not of limitation.

Figure 1:
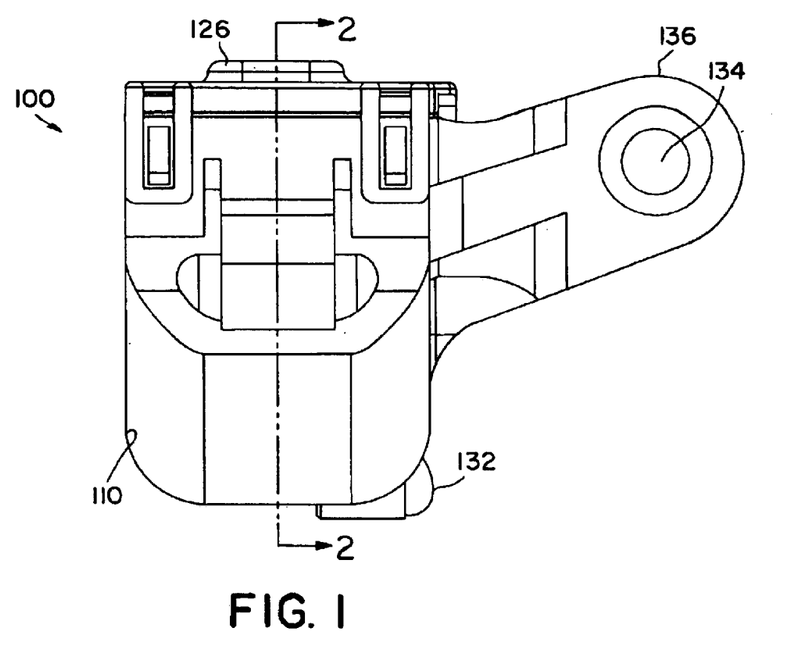
FIG. 1 is a side view of an exemplary sensor assembly consistent with the invention.
Figure 2:
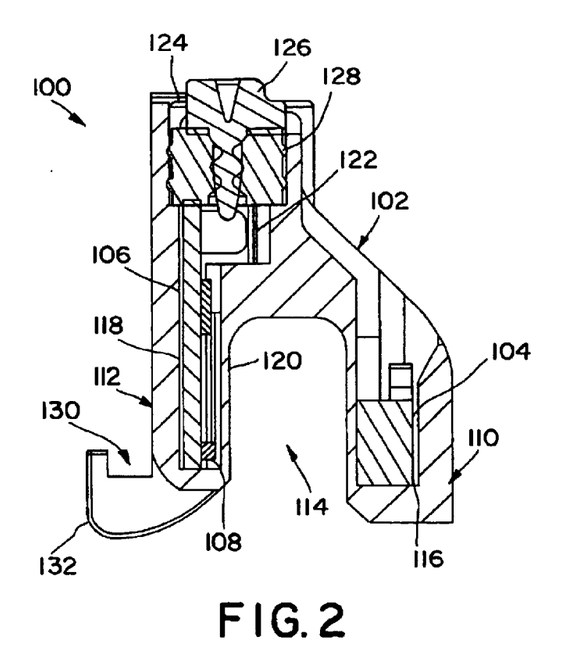
FIG. 2 is sectional view taken along lines 2—2 in FIG. 1.

Turning to FIGS. 1–2, there is illustrated one exemplary embodiment 100 of a sensor consistent with the invention. The illustrated sensor 100 includes a generally u-shaped housing 102, a permanent magnet 104, and a printed circuit board 106 (PCB) carrying a Hall Effect sensor 108. As shown, the u-shaped housing includes first 110 and second 112 opposed arms separated by a shunt opening 114. The permanent magnet 104 is disposed in a cavity 116 formed in the first arm 110. The PCB 106 is disposed in a cavity 118 in the second arm 112 with the Hall sensor 108 positioned adjacent the interior surface 120 of the second arm 112. The Hall sensor 108 is thus disposed in the magnetic field of the magnet 116 when no obstruction is present in the shunt opening 114.

As will be recognized by those skilled in the art the Hall sensor 108 provides an output depending on the magnetic flux imparted thereto. The Hall sensor 108 may be configured as a conventional two-wire hall IC that provides a digital output depending on a predetermined gauss limit associated with the magnetic field from the magnet. Preferably, however, the Hall sensor 108 is configured as a programmable hall chip, whereby the switch point gauss limits for the sensor, i.e. the points at which the output transitions between "0" and "1" values, may be set after assembly in a system. Use of a programmable Hall sensor eliminates inaccuracies in the Hall output resulting from manufacturing process tolerances.

Also, those skilled in the art will recognize that the permanent magnet 104 may be formed from a variety of materials. Conventional magnet materials such as SmCo, for example, may be used for the magnet 104. In a seat position sensing application, however, the magnet 104 is preferably constructed from Neodymium, which has been found to provide more robust magnetic circuit performance across large air gaps at extreme temperatures. In addition to performance advantages, Neodymium has been found to be less expensive than SmCo.

With continued reference to FIGS. 1 and 2, circuit traces and circuit components on the PCB 106 provide power to the Hall sensor and electrically connect the Hall sensor output to associated sensor output terminals 122. The PCB 106 may be installed through an open end of the cavity 118, which may be closed by a cover 124 fastened to the housing by a screw 126. An elastomeric seal 128 disposed below the cover may be provided to prevent contaminants from entering the cavity 118 and disrupting operation of the Hall sensor 108.

Figure 3A:
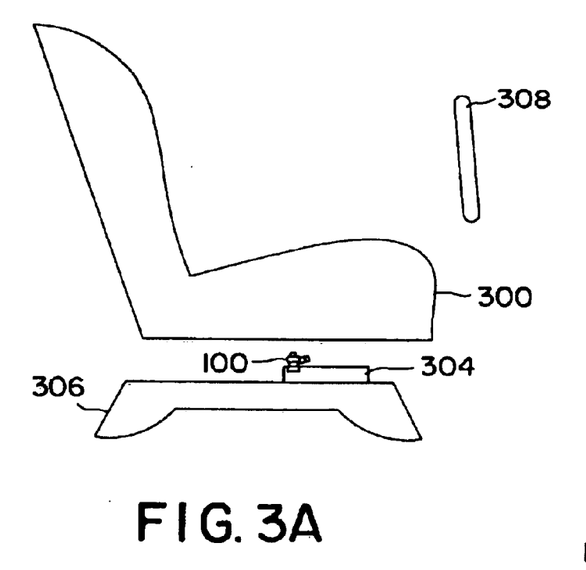
FIG. 3A illustrates an exemplary mounting arrangement for the exemplary sensor of FIG. 1, with a shunt positioned in a shunt opening of the sensor.
Figure 3B:
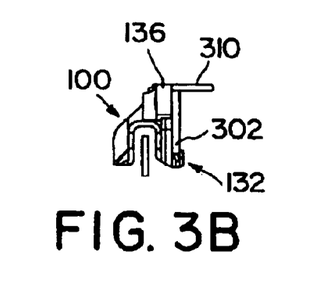
FIG. 3B is an end view of the sensor and shunt in the position illustrated in FIG. 3A.
Figure 4:
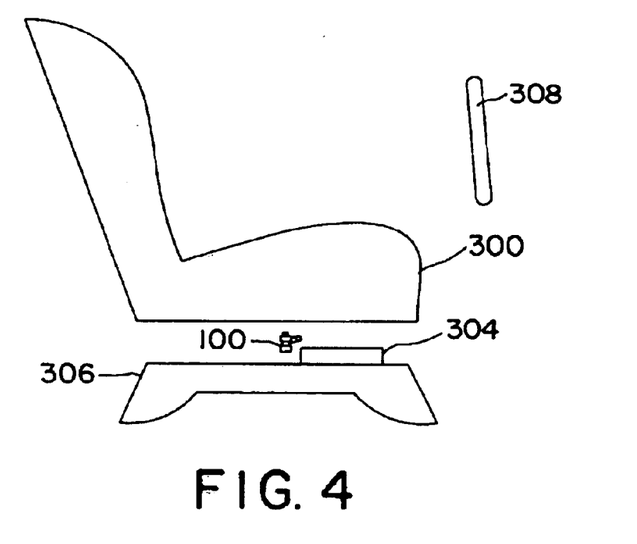
FIG. 4 illustrates an exemplary mounting arrangement for the exemplary sensor of FIG. 1, with a shunt positioned outside of the shunt opening of the sensor.

As shown, for example, in FIGS. 3–4, the sensor 100 may be used, for example, to sense the linear position of a vehicle seat 300 in connection with an air bag deployment system. With particular reference to FIG. 3B, the sensor 100 may be mounted on a movable rail 302 affixed to the vehicle seat 300 by engagement of the rail 302 with an associated slot 130 in a mounting hook portion 132 of the housing and by fastener (not shown), e.g. a screw, extending through a mounting hole 134 in a mounting portion 136 of the housing. The sensor 100 may thus be fixed to the movable rail 302 for movement with the vehicle seat 300 attached thereto.

An opposing shunt 304 is mounted to a fixed location on a fixed track 306 and is aligned with the shunt opening 114. The shunt 304 may be of uniform height and of a predetermined length for blocking the magnetic flux from the magnet 104 to the Hall sensor 104 when disposed in the shunt opening 114. The sensor thus provides two separate control signals depending on the absence or presence of the shunt 304 in the shunt opening 114 of the sensor. The presence or absence of the shunt 304 in the shunt opening 114 depends on the position of the seat 300 since the sensor 100 is linearly positioned relative to the shunt 304 with movement of the seat.

For instance, in the seat position configuration illustrated in FIGS. 3A and 3B, the seat has been moved sufficiently forward toward the steering wheel 308 such that the shunt opening 114 of the sensor 100 accepts the shunt 304. In this condition, the magnetic flux imparted to the Hall sensor 108 by the magnet 104 is not sufficient to maintain the Hall sensor output provided with no shunt is present. Accordingly a control signal indicative of this condition may be sent to an external controller in the vehicle, through an appropriate wire harness 310 connected to terminals 122, for example, to set the air bag system for deployment with reduced force.

In the seat position configuration of FIG. 4, however, the seat 300 has been moved sufficiently rearward away from the steering wheel 308 such that the shunt 304 is not disposed in the shunt opening 114. In this position, flux from the magnet 104 is imparted to the Hall sensor 108. The sensor 108 provides a control signal to set the air bag system for deployment with increased force relative to that set for the position illustrated in FIGS. 3A and 3B since the seat is deemed to be a suitable distance from the steering wheel 308.

In this exemplary embodiment, the sensor 100 is oriented such that its shunt opening is facing generally downward to accept the upward facing shunt 304 affixed to the vehicle. This configuration avoids the possibility of ferromagnetic materials, e.g. coins, falling into the shunt opening and being attracted to the magnet 104. However, the sensor could be configured with the shunt opening 114 in an upward orientation. Those skilled in the art will also recognize that the orientation of the shunt 304 and the sensor 100 may be modified so that the sensor is on the stationary rail 306 and the shunt is on the movable rail 302. Also, in some applications the shunt 304 and sensor 100 may both be applied to moveable elements to sense relative motion therebetween.

Figure 5:
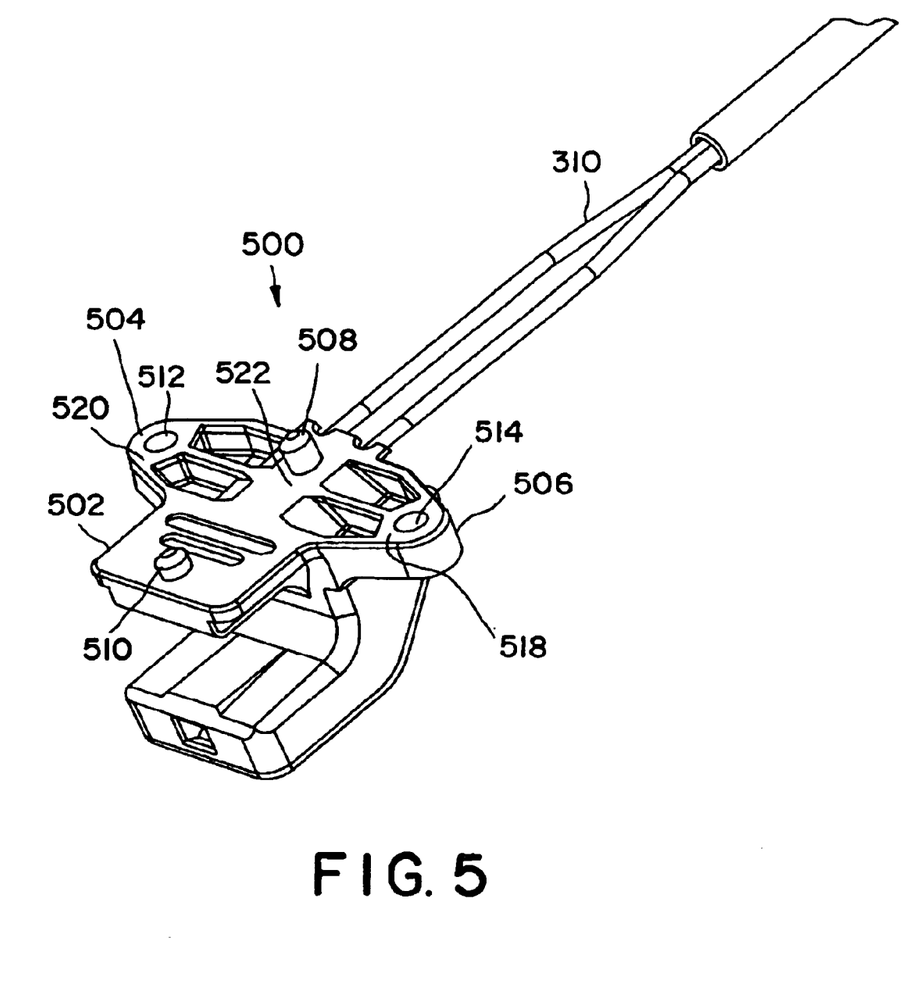
FIG. 5 is a perspective view of another exemplary sensor consistent with the invention including an alternative mounting configuration.

Turning now to FIG. 5, there is illustrated another embodiment 500 of a sensor consistent with the invention including an alternate mounting arrangement. Instead of the mounting hook 136 and mounting portion 136 configuration illustrated in FIG. 1, the housing 502 of the sensor 500 includes first and second mounting hole wings extending laterally from opposite sides thereof, and first 508 and second 510 location pins. Each mounting hole wing includes portions defining an associated mounting hole 512, 514 through which a rivet 516 (FIG. 7) or other fastener may pass to secure the sensor 500 to a movable seat rail. The location pins 508, 510 may be positioned to align with and engage corresponding openings or features of the rail to facilitate mounting.

Figure 7:
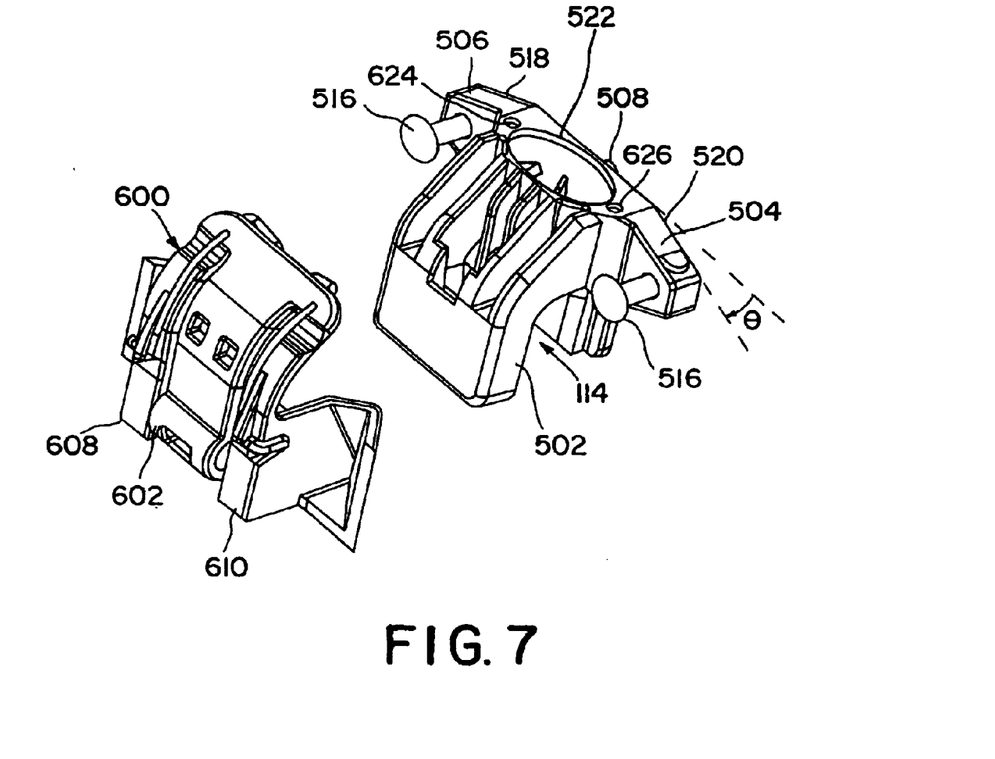
FIG. 7 is an exploded view of the sensor and illustrated in FIG. 6.

With reference also to FIG. 7, the mounting hole wings 504, 506 may extend from opposite sides of the housing 502 with the rear surfaces 518, 520 thereof extending at a slight angle θ relative to the rear surface 522 of the housing, i.e. the surface to be positioned against the movable rail. As the sensor is mounted to the rail with the rivets passing through the mounting holes, the mounting wings flex toward the rail, closing the angle θ so that the rear surfaces 518 and 520 contact the rail. Advantageously, this pre-loads the sensor against the rail thereby eliminating rattling of the senor against the rail if the rivets loosen over time. Also, the symmetrical orientation of the mounting wings on opposite sides of the housing facilitates mounting of the sensor to a rail on either the driver or passenger side of a vehicle.

Figure 6:
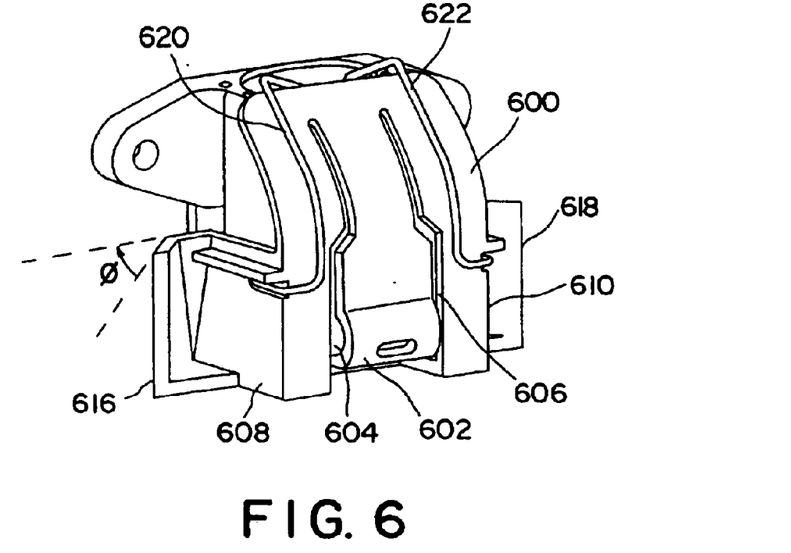
FIG. 6 is a perspective view of an exemplary sensor consistent with the invention including a spring biased cover.
Figure 8:
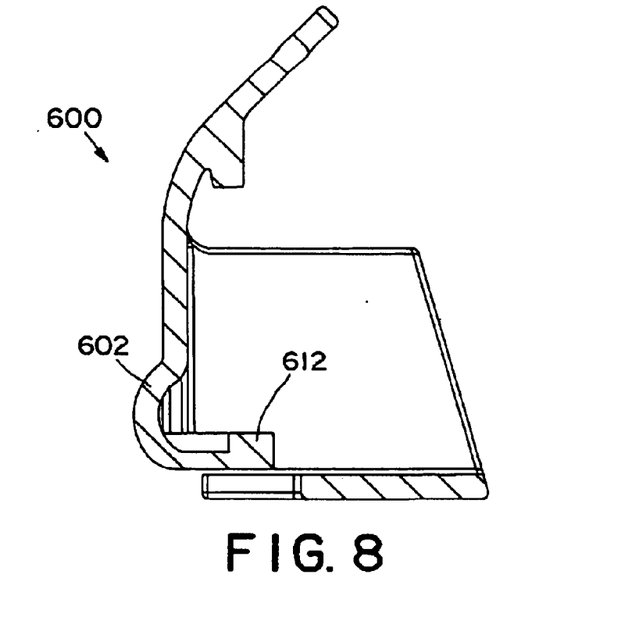
FIG. 8 is a side sectional view of the cover portion of the sensor illustrated in FIG. 6.
Figure 9:
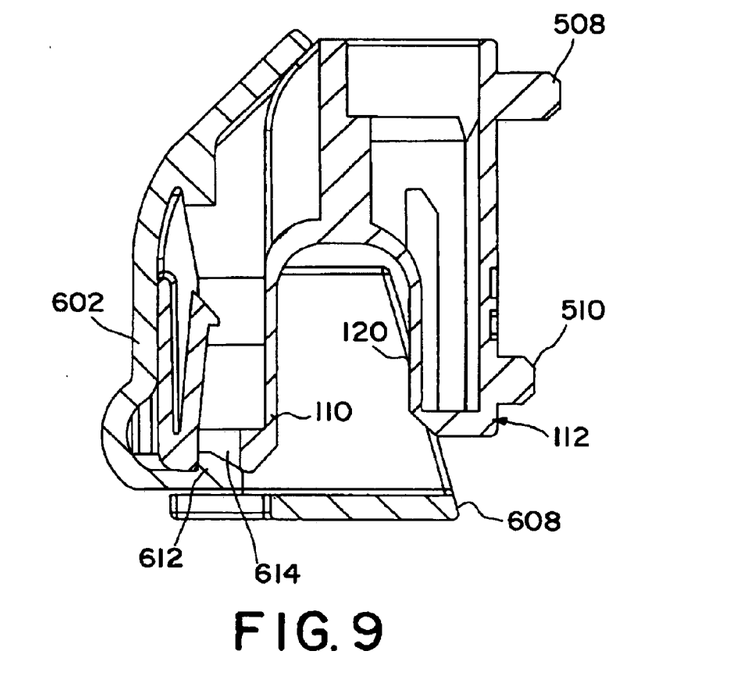
FIG. 9 is a side sectional view of the exemplary sensor with cover illustrated in FIG. 6.

As illustrated FIGS. 6–7, a sensor consistent with the present invention may also be configured with a spring-loaded plastic cover 600 for preventing ferrous materials from inadvertently entering the shunt opening 114 and interrupting the magnetic field from the magnet 104. The cover may be of unitary construction including a central portion 602 separated by first 604 and second 606 slots from first 608 and second 610 side portions. As shown in the sectional views of FIGS. 8 and 9, the central portion 602 may be configured to extend inward toward the outer arm 110 to allow a protrusion 612 at the end of the central portion to engage an associated slot 612 in the outer arm 110.

The side portions 608, 610 may be configured to extend adjacent the side surfaces of the sensor to block both sides of the shunt opening 114, as shown. Each side portion 608, 610 may include a wing 616, 618 extending laterally therefrom at an angle Φ relative to the interior surface 120 of the second sensor arm 112. In operation, engagement of the shunt 304 with an angled wing 616, 618 forces the cover 600 outward to against the bias of a spring to allow entry of the shunt into the shunt opening 114. In the illustrated exemplary embodiment, the spring is configured as two separate wire springs 620, 622 extending over the outside surface of the cover 600. Each wire spring has a first end disposed in an associated opening 624, 626 in the sensor housing, and a second end secured to an associated side portion 608, 610. The springs thus bias the cover to a closed position for preventing entry of ferrous materials and other contaminants into the shunt opening 114.

Figure 10:
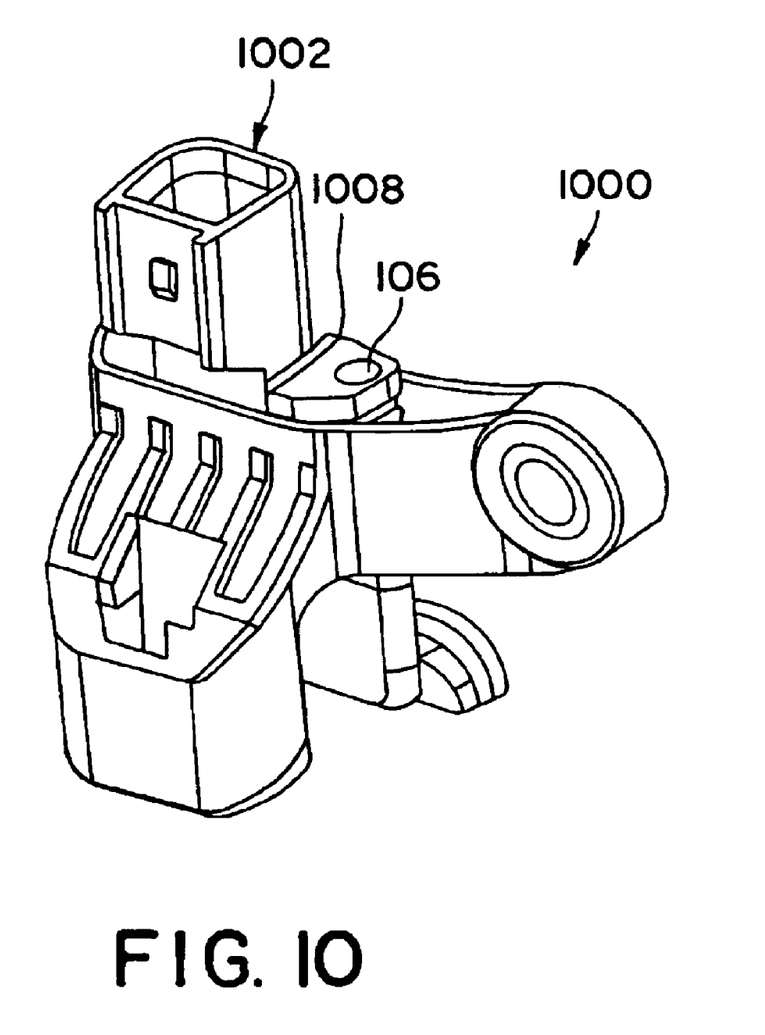
FIG. 10 is a perspective view of an exemplary sensor consistent with the invention including a connector portion.

Turning now to FIG. 10, there is shown another embodiment 1000 of a sensor consistent with the invention including a connector portion 1002. As opposed to providing solder points for a wiring harness 310, the connector configuration allows connection of the sensor 1000 to vehicle systems via a plug and socket connector configuration. The plug and socket connector configuration facillitates assembly and replacement of the sensor, and eliminates a set of solder connection points between the sensor and the vehicle systems.

Figure 11:
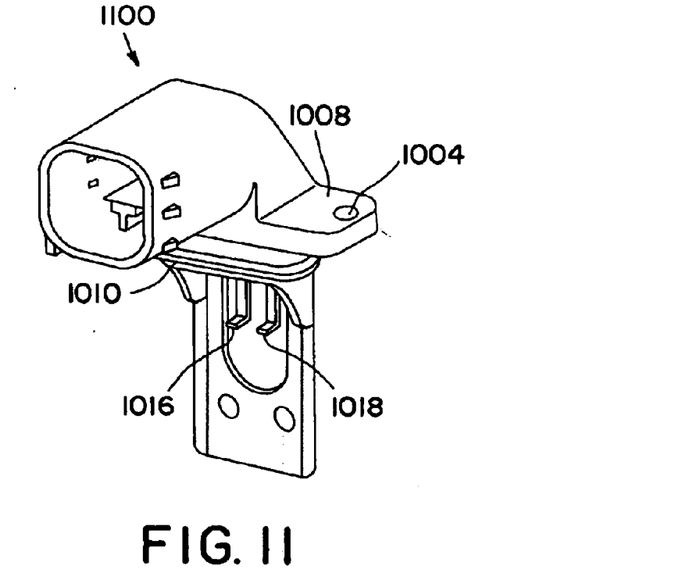
FIG. 11 is a perspective view of an exemplary right angle connector portion useful in a sensor consistent with the invention.
Figure 12:
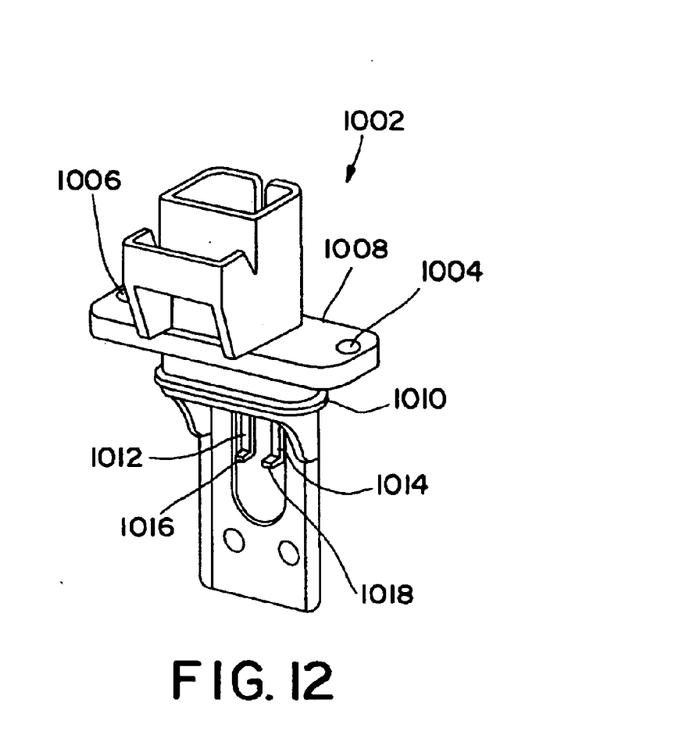
FIG. 12 is a perspective view of an exemplary in-line connector portion useful in a sensor consistent with the invention.

As shown in FIG. 12, the connector 1002 may be a separate part secured to the sensor via fasteners extending through mounting holes 1004, 1006, in a connector mounting plate 1008. The connector 1002 may be viewed as an in-line connector configuration. FIG. 11 illustrates an alternative right-angle connector configuration 1100, which allows for a more compact configuration where mounting space is limited. In either embodiment, the connector may, for example, replace the cover 124 and screw 126 to close the top of the cavity 118 in which the PCB is received. An elastomeric seal 1010 may be provided to prevent entry of contaminants into the cavity in which the connector is installed.

Electrical terminals 1012, 1014 may extend downward from the connector receptacle. Ends 1016, 1018 of the terminals may be angled and positioned to extend through corresponding openings in the PCB so that they are exposed to the back surface of the PCB for soldering thereto using automated point to point soldering equipment. The sensor housing may also include features (not shown) for holding the PCB in the proper position to aid soldering. Advantageously, soldering the connector terminals to the back of the PCB keeps soldering heat away from sensitive components on the PCB, thereby allowing a reduction in the PCB size and cost.

Figure 13:
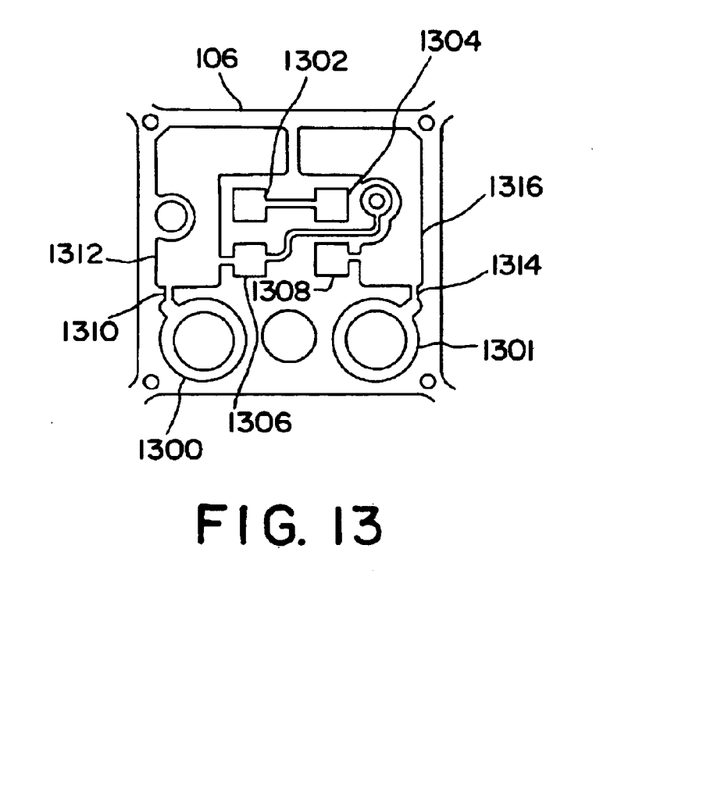
FIG. 13 is a plan view of an exemplary conductive trace pattern for a PCB useful in connection with a sensor consistent with the invention.

FIG. 13 illustrates an exemplary configuration for conductive traces on a PCB 106 in a sensor consistent with the invention. In the illustrated embodiment, areas where soldering heat is applied, e.g. trace 1300, 1301 are separated from areas 1302, 1304, 1306, 1308 were heat sensitive components are connected by thin heat throttle traces 1310, 1314 and heat sink regions 1312, 1316. In the illustrated exemplary embodiment, for example, heat may be applied to secure a connecting terminal to the circular trace 1300. The trace 1300, however is isolated from trace 1306 to which a heat sensitive component, e.g. ceramic chip capacitors, may be attached by a thin heat throttle trace 1310 and then a heat sink region 1312. The thin heat throttle trace 1310 physically restricts the heat transferred to the heat sink region 1312, which has a large thermal mass for substantially dissipating any heat transferred through the thin heat throttle trace. The heat sensitive component attached to trace 1306, for example, is thus protected from the soldering heat applied to the circular trace 1300. In addition, the conductive traces may be routed through layers of the PCB, e.g. in serpentine paths to route heat transfer away from heat sensitive components.

Figure 14:
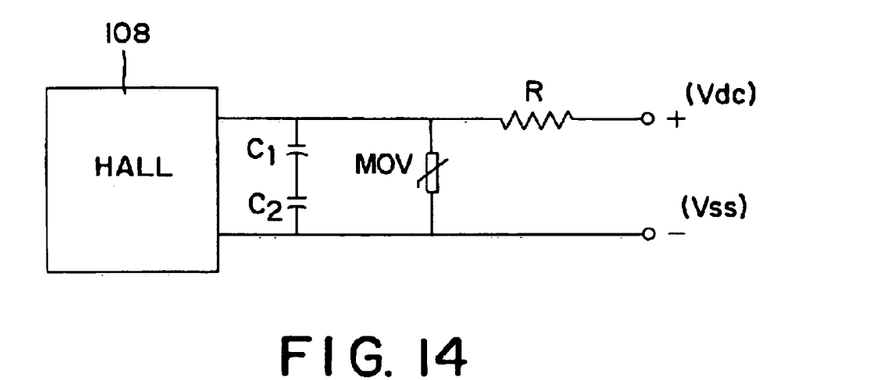
FIG. 14 is circuit diagram illustrating an exemplary EMI protection circuit for providing supply voltage to a Hall Effect sensor in a sensor consistent with the invention.

FIG. 14 is an exemplary circuit diagram for the components on an exemplary PCB consistent with the invention. The exemplary circuit includes series connected capacitors C1 and C2 connected in parallel with a varistor MOV across the input terminals of the Hall sensor 108. Supply voltage is applied to the sensor 108 by connecting a supply source Vdc in parallel with the varistor MOV through resistor R. Advantageously, the varistor MOV in parallel with capacitors C1 and C2 provides EMI protection allowing the hall element to pass a directly applied RF EMI source.

Figure 15:
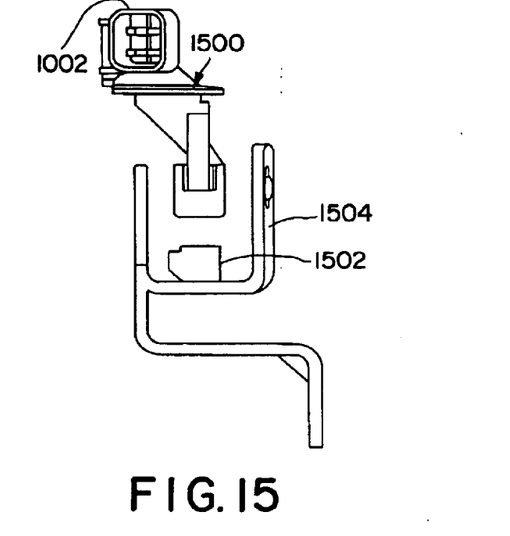
FIG. 15 is a perspective view of an exemplary two-piece sensor configuration consistent with the invention.
Figure 16:
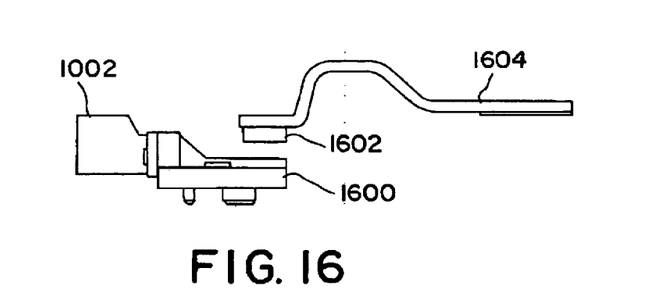
FIG. 16 is a perspective view of an another exemplary two-piece sensor configuration consistent with the invention.
Figure 17:
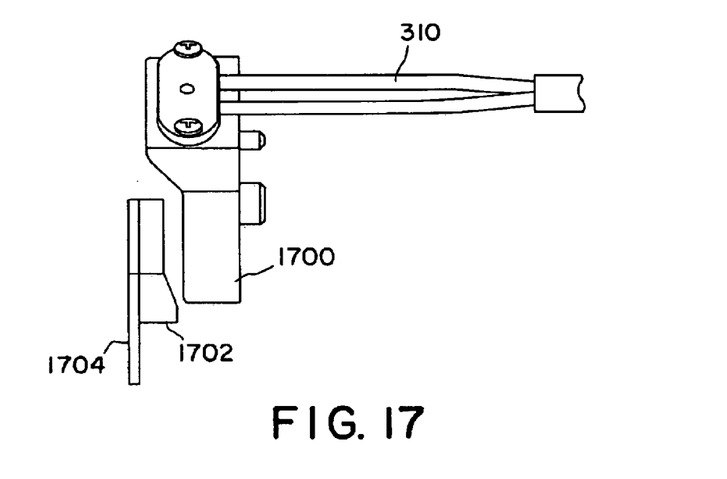
FIG. 17 is a perspective view of another exemplary two-piece sensor configuration consistent with the invention.

FIGS. 15–17 illustrate alternative embodiments and mounting configurations for a sensor consistent with the invention wherein the hall sensor and magnet are separated into separate components, as opposed to being contained in separate arms of a u-shaped housing. FIG. 15 illustrates an embodiment including a sensor portion 1500 including a PCB 106 and hall sensor 108, as described above, and a separate magnet portion 1502. The magnet portion 1502 is mounted to a stationary U-shaped bracket 1504 affixed to the stationary seat rail, and the sensor portion 1500 is movable relative thereto. A first output is provided by the sensor 1500 when it is adjacent the magnet 1502. A second distinct output is provided by the sensor when it moves past the magnet so that the magnetic flux imparted to the hall sensor 108 in the sensor portion 1500 is reduced below the gauss limits of the sensor 108.

FIG. 16 illustrates another embodiment wherein a sensor portion 1600 is oriented below a magnet portion 1602, which is attached to a bracket 1604 affixed to a seat rail. Again the sensor portion 1600 provides distinct outputs depending on its position relative to the magnet. Another embodiment is illustrated in FIG. 17, wherein a sensor portion 1700 is positioned adjacent a magnet portion 1702 attached to a vertical bracket 1704 which is affixed to a seat rail. The sensor portion 1700 may move linearly past the magnet portion 1702 to provide distinct position outputs.

It is to be understood that the embodiments that have been described herein are but some of the several which utilize this invention and are set forth here by way of illustration, but not of limitation. For example, the various features illustrated and described herein may be combined with other features illustrated and described herein. It is obvious that many other embodiments, which will be readily apparent to those skilled in the art may be made without departing materially from the spirit and scope of the invention as defined in the appended claims.

What is claimed is:

1. A seat position sensor comprising:
   a generally u-shaped housing including first and second arms separated by a shunt opening;
   a magnet disposed in said first arm;
   a Hall Effect sensor disposed in said second arm and in a magnetic field generated by said magnet; and
   first and second mounting wings extending from opposite sides of said housing, each of said mounting wings including a mounting opening for receiving a fastener for fixing said housing to a mounting position; said mounting wings configured to flex inward against said mounting position upon fastening said housing to said mounting position.

2. A seat position sensor according to claim 1, wherein said housing further comprises at least one location pin extending from a surface thereof and positioned to align with, a corresponding opening associated with said mounting position.

3. A seat position sensor according to claim 2, wherein said housing comprises first and second ones of said location pins.

4. A seat position sensor according to claim 1, wherein said magnet comprises neodymium.

5. A seat position sensor according to claim 1, wherein said Hall Effect sensor is a programmable Hall Effect sensor.

6. A seat position sensor according to claim 1, said sensor further comprising a cover disposed on said housing, said cover being spring biased in a first position wherein a portion of said cover obstructs said shunt opening and being movable against said spring bias to a second position for allowing entry of a shunt into said shunt opening.

* * * * *